(12) United States Patent
Wang

(10) Patent No.: US 10,207,759 B2
(45) Date of Patent: Feb. 19, 2019

(54) DETACHABLE MULTIMEDIA CONTROL APPARATUS

(71) Applicant: Chi Wang, New Taipei (TW)

(72) Inventor: Chi Wang, New Taipei (TW)

( * ) Notice: Subject to any disclaimer, the term of this patent is extended or adjusted under 35 U.S.C. 154(b) by 52 days.

(21) Appl. No.: 15/429,292

(22) Filed: Feb. 10, 2017

(65) Prior Publication Data
US 2018/0050752 A1 Feb. 22, 2018

(30) Foreign Application Priority Data

Aug. 17, 2016 (TW) .............................. 105212494 U

(51) Int. Cl.
| | |
|---|---|
| B62J 6/00 | (2006.01) |
| B62J 6/02 | (2006.01) |
| B62J 6/04 | (2006.01) |
| B62J 3/00 | (2006.01) |
| B62K 21/12 | (2006.01) |
| B62M 6/90 | (2010.01) |
| G06F 3/16 | (2006.01) |
| H02J 7/00 | (2006.01) |
| H04R 5/02 | (2006.01) |
| H04R 5/04 | (2006.01) |
| B62J 99/00 | (2009.01) |

(52) U.S. Cl.
CPC ................. *B62J 6/005* (2013.01); *B62J 3/00* (2013.01); *B62J 6/02* (2013.01); *B62J 6/04* (2013.01); *B62K 21/12* (2013.01); *B62M 6/90* (2013.01); *G06F 3/165* (2013.01); *H02J 7/0052* (2013.01); *H04R 5/02* (2013.01); *H04R 5/04* (2013.01); *B62J 2006/006* (2013.01); *B62J 2099/0006* (2013.01); *B62K 2207/00* (2013.01); *B62K 2207/02* (2013.01); *H02J 7/0042* (2013.01); *H02J 2007/0062* (2013.01); *H04R 2430/01* (2013.01)

(58) Field of Classification Search
CPC ..... B82J 6/005; B82J 6/04; B82J 3/00; H04R 5/04; H04R 5/02; H04R 2430/01; H02J 7/0052; H02J 7/0042; H02J 2007/0062; B62K 21/12; B62K 2207/00; G06F 3/165; B62M 6/90
See application file for complete search history.

(56) References Cited

U.S. PATENT DOCUMENTS

| | | | |
|---|---|---|---|
| 6,317,036 B1 * | 11/2001 | Popat .......................... | B62J 3/00 340/427 |
| 2011/0200202 A1 * | 8/2011 | Flanigan ............... | B60L 3/0015 381/61 |
| 2016/0362154 A1 * | 12/2016 | Poole ....................... | B62J 6/003 |

* cited by examiner

*Primary Examiner* — David V Bruce
(74) *Attorney, Agent, or Firm* — Hauptman Ham, LLP

(57) ABSTRACT

The present invention provides a detachable multimedia control apparatus, comprising: a front housing structure including a left turn signal, a right turn signal and a central light; a rear housing structure including a speaker module and a safety switch module; a top housing structure including a control module which controls the speaker module and the central light; a bottom housing structure including a first joining structure; a processor disposed inside the movable multimedia control apparatus and electrically connected to the left turn signal, the right turn signal, the central light, the speaker module, the safety switch signal and the control module; and a power module disposed inside the detachable multimedia control apparatus and electrically connected to the left turn signal, the right turn signal, the central light, the speaker module, and the processor, wherein the power module is configured to be unlocked by the safety switch module.

19 Claims, 16 Drawing Sheets

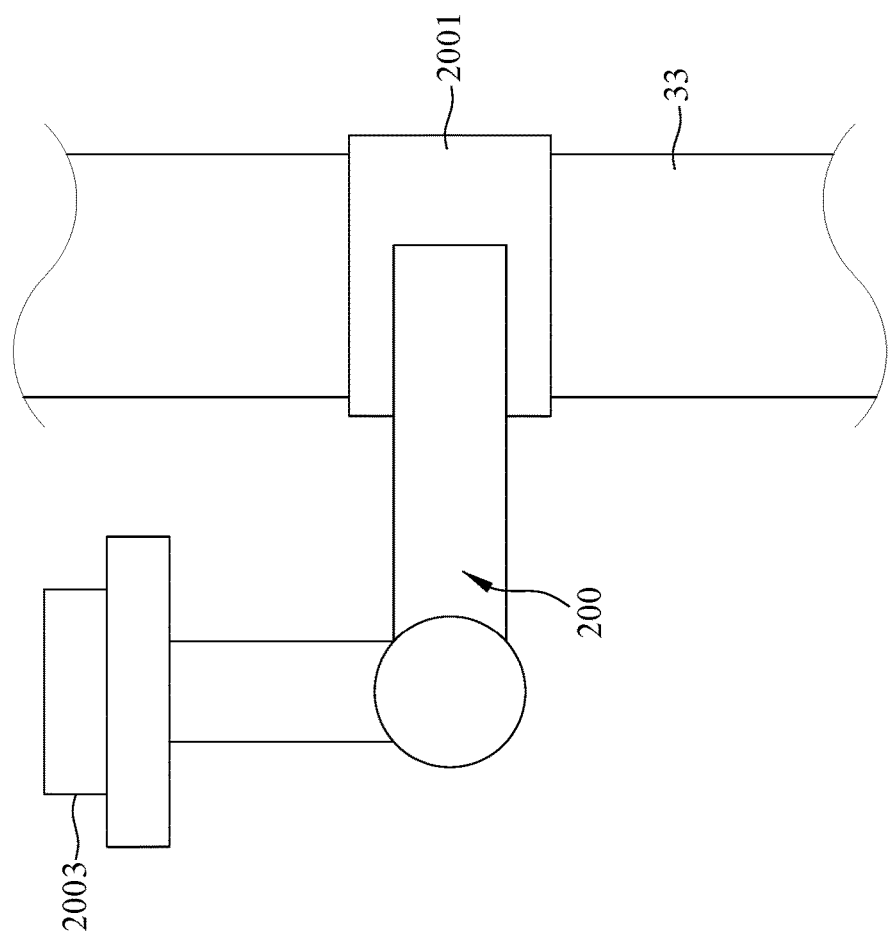

DETACHABLE MULTIMEDIA CONTROL APPARATUS

CROSS-REFERENCE TO RELATED APPLICATION

This application claims the priority of Taiwanese patent application No. 105212494, filed on Aug. 17, 2016, which is incorporated herewith by reference.

BACKGROUND OF THE INVENTION

1. Field of the Invention

The present invention generally relates to a multimedia control apparatus, and particularly relates to a detachable multimedia control apparatus which is characterized by being detachable and having a variety of multimedia functions.

2. The Prior Arts

In practical applications, multimedia is a media for interactive communication and information exchange between a person and a device using a combination of two or more media. Such media may include text, lights, images, pictures, audio (including music, off-screen voice, and special sound effects), animations and video, and interactive functions provided by programs. As technology advances, a variety of multimedia apparatus, such as radio, MP3 player, smart phone and various illumination devices, has been applied to daily lives, and many of them have already been joined to transportations such as cars or metros.

On the other hand, owing to the rising awareness of energy saving, more and more people tend to ride a bicycle instead of riding a motorcycle or a motor vehicle. However, the safety of bicycle riding is much lower than riding a motorcycle or a vehicle since conventional bicycles are not yet installed with lighting multimedia apparatus in sufficient amount and safety. Furthermore, urban roads in Taiwan are not yet constructed with sufficient bicycle lanes and the bicycles have to share lanes with motorcycles and vehicles. In view of the reasons above, the safety of bicycles is greatly reduced if the bicycles have no lighting multimedia apparatus in sufficient amount and safety when competing lanes with the vehicles or motorcycles.

Based on the reasons above, it is necessary to provide a detachable multimedia control apparatus which can be installed onto a bicycle and provided with entertainment and safety when riding a bicycle. When the bicycle is not ridden, the detachable multimedia control apparatus can be removed to be used independently, or can be installed onto other devices.

SUMMARY OF THE INVENTION

In view of the disadvantages described above, the purpose of the present invention is to provide a detachable multimedia control apparatus, comprising: a front housing structure, a rear housing structure, a top housing structure, a bottom housing structure, a processor and a power module. The front housing structure includes a left turn signal, a right turn signal and a central light. The rear housing structure, which is opposite to the front housing structure, includes a speaker module and a safety switch module. The top housing structure includes a control module which controls the speaker module and the central light. The bottom housing structure, which is opposite to the top housing structure, includes a first joining structure. The processor is disposed inside the detachable multimedia control apparatus and is electrically connected to the left turn signal, the right turn signal, the central light, the speaker module, the safety switch signal and the control module. The power module is disposed inside the detachable multimedia control apparatus and is electrically connected to the left turn signal, the right turn signal, the central light, the speaker module, and the processor. The power module is configured to be unlocked by the safety switch module. The front housing structure and the rear housing structure are fixed to the top housing structure, and the bottom housing structure is engaged with the front housing structure, the rear housing structure and the top housing structure.

Preferably, the detachable multimedia control apparatus further comprises a rear type multimedia indication device. The processor of the detachable multimedia control apparatus is electrically connected to the rear type multimedia indication device by an external control module of the bottom housing structure. The rear type multimedia indication device includes a simple front housing structure, a simple rear housing structure, a simple top housing structure, a simple bottom housing structure, a simple processor, and a simple power module. The simple front housing structure includes a left turn warning signal, a right turn warning signal and a central brake light. The simple rear housing structure is opposite to the simple front housing structure. The simple bottom housing structure, which is opposite to the simple top housing structure, includes a second joining structure. The simple processor is disposed inside the rear type multimedia indication device and is electrically connected to the processor, the left turn warning signal, the right turn warning signal, and the central brake light. The simple power module is disposed inside the rear type multimedia indication device and is electrically connected to the left turn warning signal, the right turn warning signal, the central brake light, and the simple processor. The simple processor is electrically connected to the processor by a simple external control module of the simple bottom housing structure. The simple front housing structure and the simple rear housing structure are fixed to the simple top housing structure, and the simple bottom housing structure is engaged with the simple front housing structure, the simple rear housing structure, and the simple top housing structure.

Preferably, the detachable multimedia control apparatus and the rear type multimedia indication device are joined to a bicycle by the first joining structure and the second joining structure respectively.

Preferably, the first joining structure is a first slide groove structure, and the second joining structure is a second slide groove structure.

Preferably, the detachable multimedia control apparatus is joined to a bicycle by the first slide groove structure and a first adaptor, and the rear type multimedia indication device is joined to the bicycle by the second slide groove structure and a second adaptor.

Preferably, the detachable multimedia control apparatus further comprises a turn signal controller. The detachable multimedia control apparatus is further electrically connected to the turn signal controller by the processor. The turn signal controller is disposed on a handlebar of the bicycle. The left turn signal, the right turn signal, the left turn warning signal and the right turn signal are switched on by the turn signal controller.

Preferably, the rear type multimedia indication device further comprises a brake sensor. The rear type multimedia indication device is electrically connected to the brake sensor by the simple processor and the simple external control module. The brake sensor is disposed on a rear wheel rim of the bicycle.

Preferably, the rear type multimedia indication device further comprises a second brake sensor, the rear type multimedia indication device is electrically connected to the second brake sensor by the simple processor, the simple external control module, the external control module, and the processor. The second brake sensor is disposed on a front wheel rim of the bicycle.

Preferably, the top housing structure further comprises a solar panel which is electrically connected to the power module.

Preferably, the speaker module includes a left audio channel and a right audio channel, the volume of the left audio channel and the right audio channel can be controlled by the control module.

Preferably, the safety switch module is a lock structure.

Preferably, the detachable multimedia control apparatus further comprises a first USB slot and a memory card slot, the first USB slot and the memory card slot are electrically connected to the processor.

Preferably, the rear type multimedia indication device further comprises a second USB slot which is electrically connected to the simple processor.

Preferably, the first USB slot and a charging device are connected to each other such that the detachable multimedia control apparatus is charged.

Preferably, the second USB slot and a charging device are connected to each other such that the rear type multimedia indication device is charged.

Preferably, the first USB slot and an USB device are connected to each other, or the memory card slot and a memory card are connected to each other, such that the speaker module of the detachable multimedia control apparatus functions as a MP3 music player device.

Preferably, the detachable multimedia control apparatus further comprises an antenna, which is electrically connected to the processor. The speaker module receives an amplitude modulation or frequency modulation signal via the antenna, the processor and the control module such that the speaker module functions as a radio.

Preferably, the detachable multimedia control apparatus further comprises a shelf for placing a mobile device or a navigation device.

Preferably, the control module includes a forward/volume up button, a play/pause button, a backward/volume down button, a MP3/radio switch button, a light flash control button, a central light brightness control button, an anti-theft switch and a power switch.

Preferably, the bottom housing structure further comprises an alarming horn for sounding an alarm.

Other purposes, advantages and novel characteristics of the present invention can be understood from the detailed description of the present invention hereafter and the drawings appended.

BRIEF DESCRIPTION OF THE DRAWINGS

FIG. 13b is schematic diagram of the structure of another adaptor according to an embodiment of the present invention.

DETAILED DESCRIPTION OF THE PREFERRED EMBODIMENT

The drawings and reference symbols are incorporated hereafter to further illustrate the embodiments of the present invention so that the present invention can be implemented by a person skilled in the art.

Figure 1A:
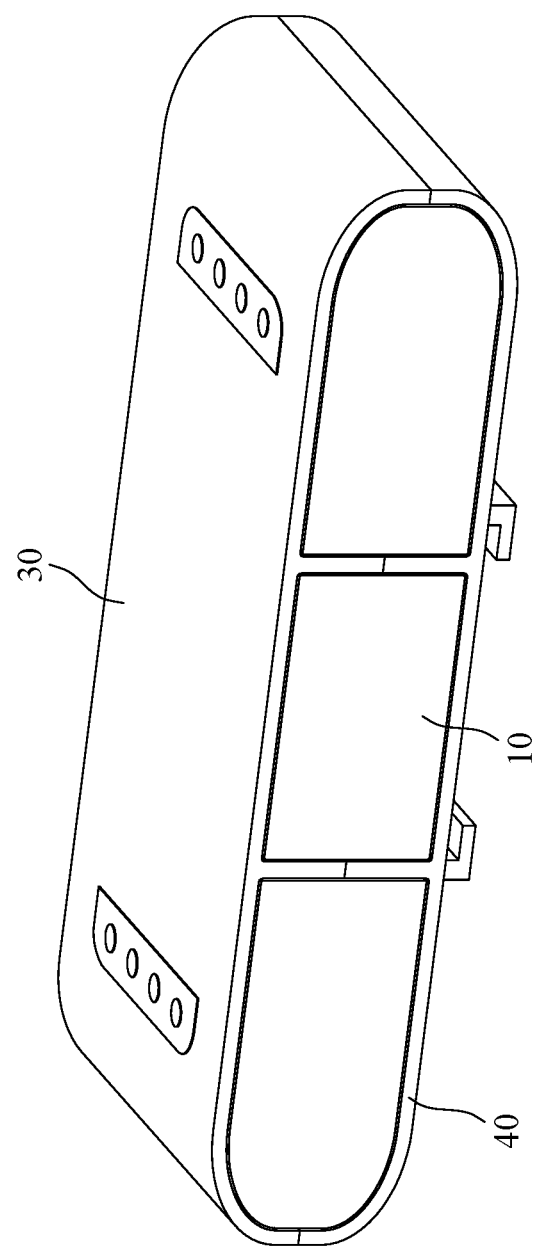
FIG. 1a is a schematic diagram of the overall structure of the front side of the detachable multimedia control apparatus according to an embodiment of the present invention.
Figure 1B:
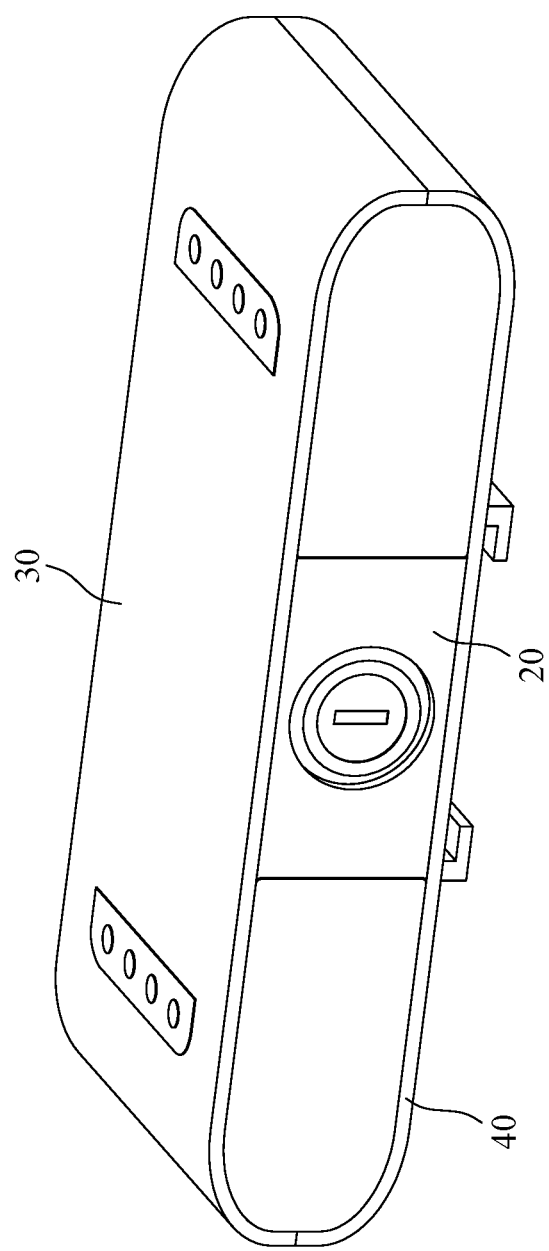
FIG. 1b is a schematic diagram of the overall structure of the rear side of the detachable multimedia control apparatus according to an embodiment of the present invention.

FIG. 1a is a schematic diagram illustrating the overall structure of the front side of the detachable multimedia control apparatus according to an embodiment of the present invention; and FIG. 1b is a schematic diagram illustrating the overall structure of the rear side of the detachable multimedia control apparatus according to an embodiment of the present invention. Referring to FIGS. 1a and 1b, the detachable multimedia control apparatus 1 according to an embodiment of the present invention comprises a front housing structure 10, a rear housing structure 20, a top housing structure 30 and a bottom housing structure 40. The front housing structure 10 is opposite to the rear housing structure 20, and the top housing structure 30 is opposite to the bottom housing structure 40.

Figure 2A:
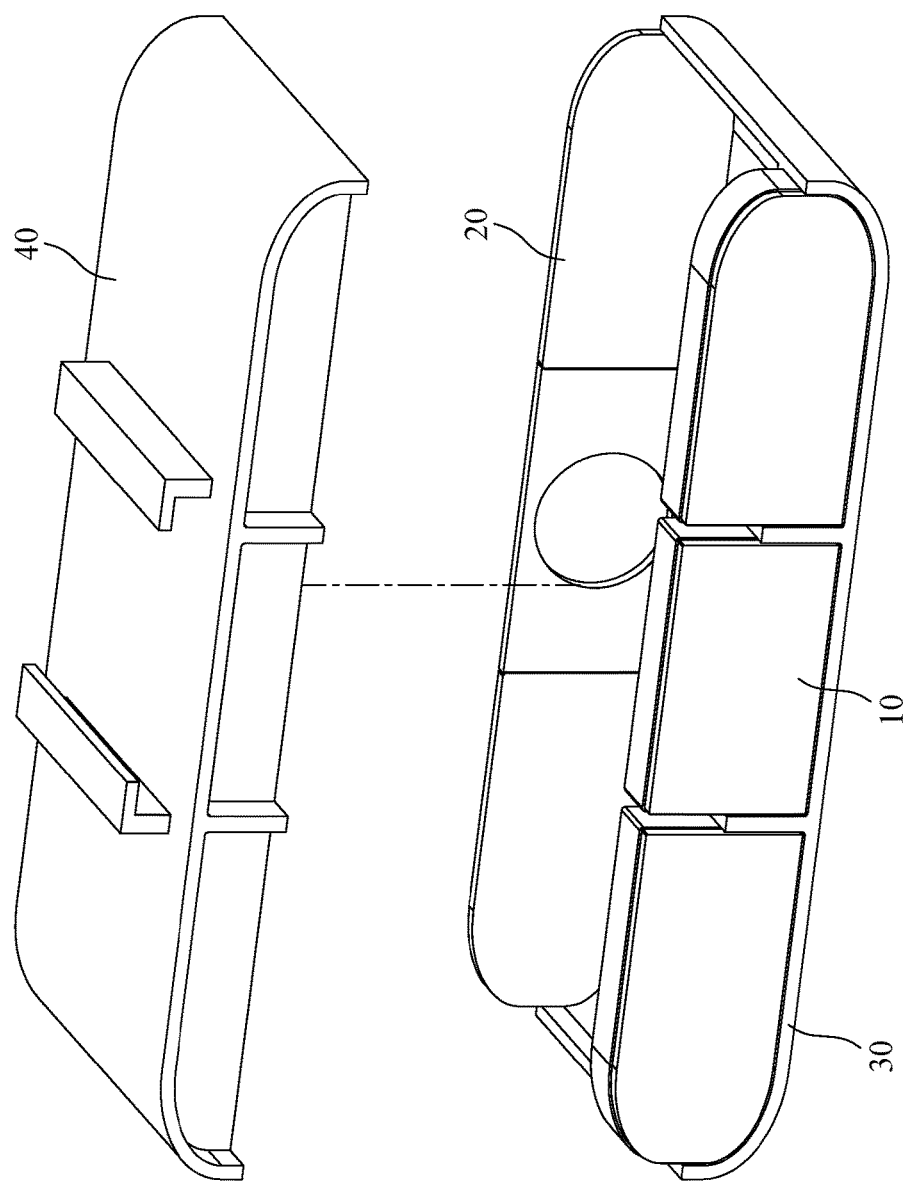
FIG. 2a is a front view of an exploded diagram of the detachable multimedia control apparatus according to an embodiment of the present invention.
Figure 2B:
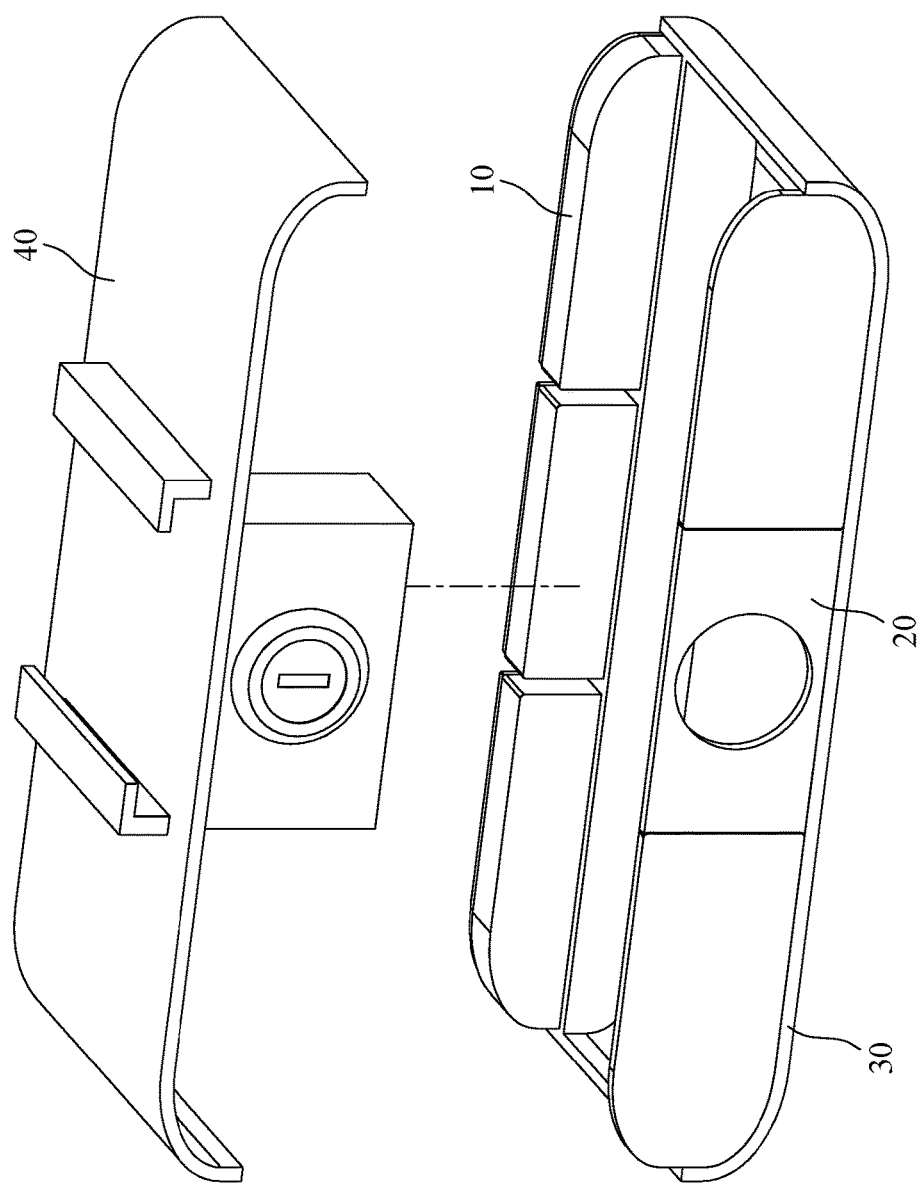
FIG. 2b is a rear view of an exploded diagram of the detachable multimedia control apparatus according to an embodiment of the present invention.

FIG. 2a is a schematic diagram illustrating a front view of the detachable multimedia control apparatus according to an embodiment of the present invention in an exploded state; and FIG. 2b is a schematic diagram illustrating a rear view of the detachable multimedia control apparatus according to an embodiment of the present invention in an exploded state. Referring to FIGS. 2a and 2b, in an embodiment of the present invention, the front housing structure 10 and the rear housing structure 20 are fixed to the top housing structure 30. After the fixation is completed, the bottom housing structure 40 is engaged with the front housing structure 10, the rear housing structure 20, and the top housing structure 30 to constitute the detachable multimedia control apparatus 1.

Figure 3:
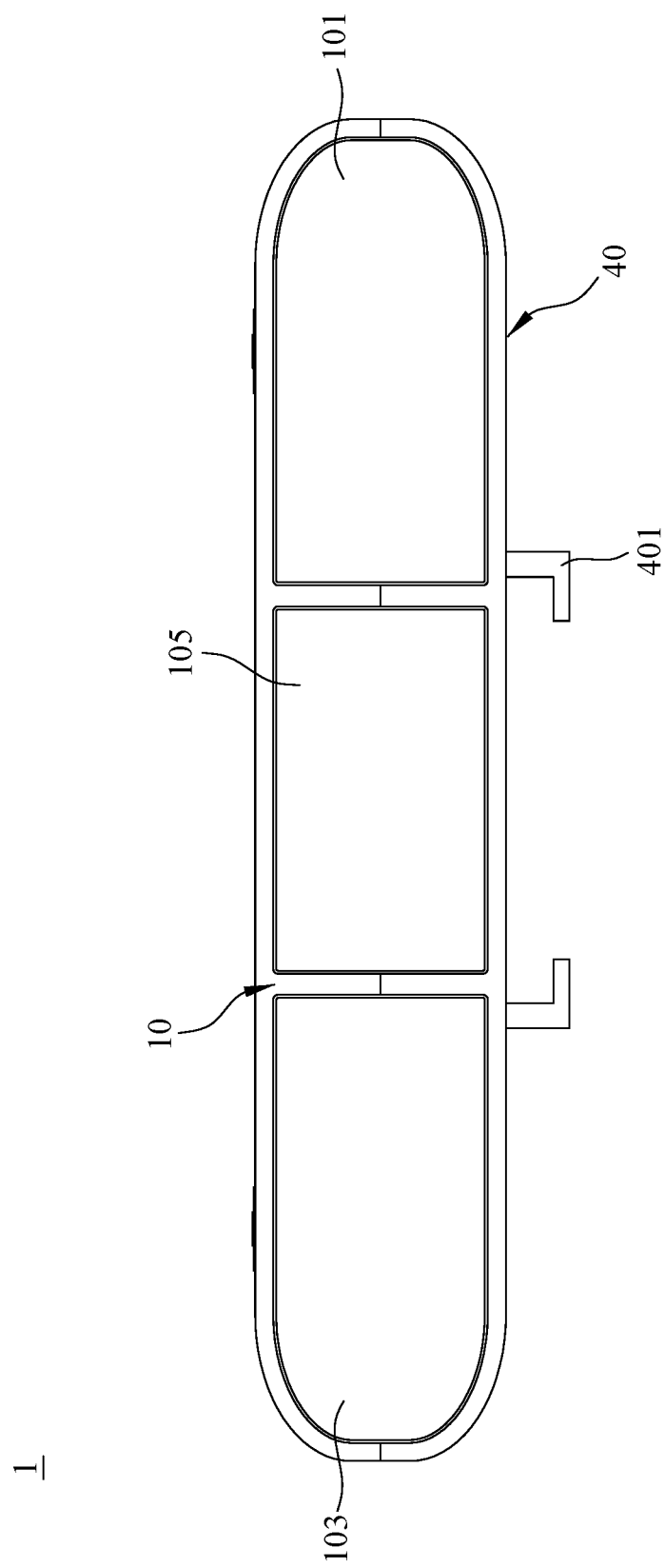
FIG. 3 is a front view of the detachable multimedia control apparatus according to an embodiment of the present invention.

Each of the housing structures of the detachable multimedia control apparatus 1 will be described hereafter in details. FIG. 3 is a front view illustrating the front structure of the detachable multimedia control apparatus according to an embodiment of the present invention. Referring to FIG. 3, the front housing structure 10 includes a left turn signal 101, a right turn signal 103 and a central light 105. Each of the left turn signal 101, the right turn signal 103 and the central light 105 is electrically connected to a processor (not shown) and a power module (not shown) which are located inside the detachable multimedia control apparatus 1. As shown in FIG. 3, a first joining structure 401 is located at the bottom housing structure 40. In an embodiment of the present invention, each of the left turn signal 101 and the right turn signal may include an arrow indication graphic (not shown), so that the observer can clearly see the direction of the turn signals. On the other hand, in other embodiments of the present invention, the front housing structure 10 may further include a driving video recorder (not shown). The driving video recorder can be provided on the exterior of the front housing structure 10 by the ways of hanging, or can also be provided in the detachable multimedia control apparatus 1. The front housing structure 10 is hollowed out at a corresponding position so that the driving video recorder is capable to record the traffic conditions successfully.

Figure 4:
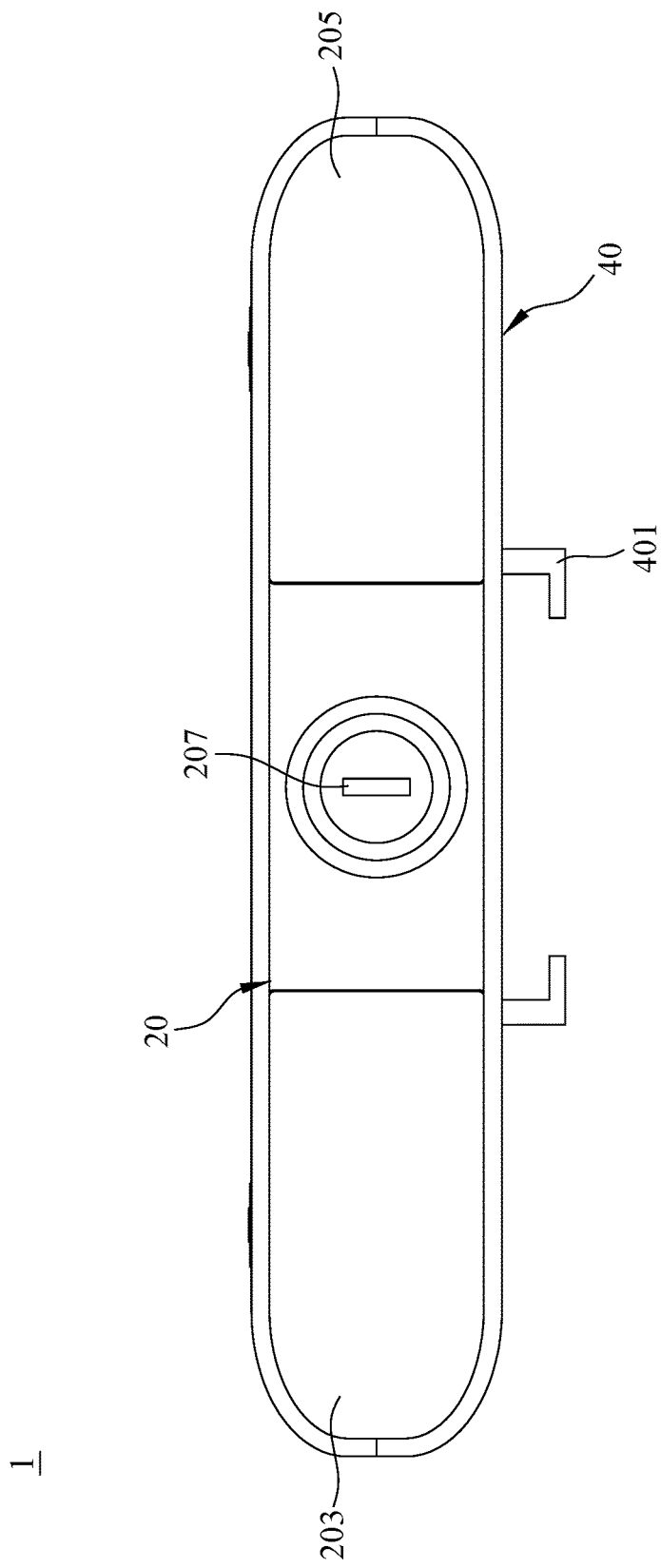
FIG. 4 is a rear view of the detachable multimedia control apparatus according to an embodiment of the present invention.

FIG. 4 is a rear view illustrating the rear structure of the detachable multimedia control apparatus according to an embodiment of the present invention. Referring to FIG. 4, the rear housing structure 20 is opposite to the front housing structure 10. The rear housing structure 20 includes a speaker module and a safety switch module 207. The speaker module includes a left audio channel 203 and a left audio channel 205. In an embodiment of the present invention, the safety switch module 207 is a lock structure, which can be unlocked by a key to relieve a lock by a power module (not shown) disposed inside the detachable multimedia control apparatus 1. In addition, each of the speaker module and the safety switch module 207 is electrically connected to a processor (not shown) and a power module (not shown), which are located inside the detachable multimedia control apparatus 1. As shown in FIG. 4, a first joining structure 401 is located at the bottom housing structure 40.

Figure 5:
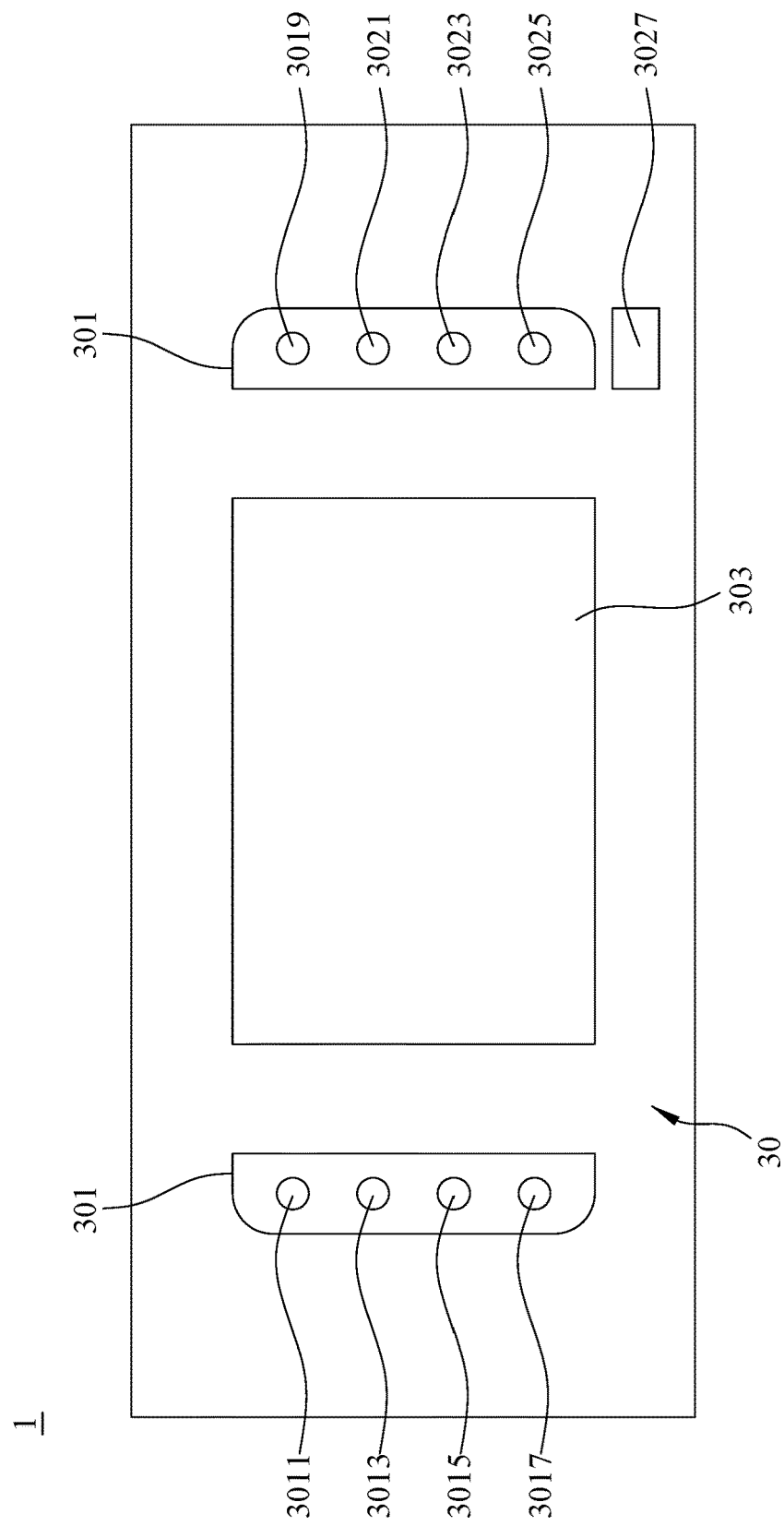
FIG. 5 is a schematic diagram of the top housing structure of the detachable multimedia control apparatus according to an embodiment of the present invention.

FIG. 5 is a schematic diagram illustrating the top housing structure of the detachable multimedia control apparatus according to an embodiment of the present invention. Referring to FIG. 5, the top housing structure 30 includes a control module 301, which is electrically connected to the processor. The control module 301 can control the speaker module and the central light 105 via the processor. Specifically, the control module 301 includes a forward/volume up button 3011, a paly/pause button 3013, a backward/volume down button 3015, a MP3/radio switch button 3017, a light flash control button 3019, a central light brightness control button 3021, an anti-theft switch 3023 and a power switch 3025. Furthermore, in other embodiments of the present invention, the top housing structure 30 may further include a clock (not shown). The clock can be provided on the exterior of the top housing structure 30 by ways of hanging, or can also be provided in the detachable multimedia control apparatus 1. The top housing structure 30 is hollowed out at a corresponding position so that the clock can be seen by the user.

In an embodiment of the present invention, the light flash control button 3019 can control the central light 105, the left turn signal 101 or the right turn signal 103 to flash (The light flash control button 3019 is pressed once to flash the left turn signal 101 and the right turn signal 103. When the light flash control button 3019 is pressed one more time, the central light 105 displays the maximum brightness while the left turn signal 101 and the right turn signal 103 flash. When the light flash control button 3019 is pressed another time, the central light 105 is turned off but the left turn signal 101 and the right turn signal 103 keep flashing. When the light flash control button 3019 is pressed further one more time, all the signals are turned off. The above-mentioned cycle can be repeated). The central light brightness control button 3021 can control the brightness of the central light 105, and the power switch 3025 can turn on the power of the detachable multimedia control apparatus 1. Before the power switch 3025 is turned on, the detachable multimedia control apparatus 1 is required to relieve the lock of the power module of the detachable multimedia control apparatus 1 through the safety switch module 207. In other words, to turn on the power of the detachable multimedia control apparatus 1, the lock of the safety switch module 207 to the power module must first be relieved, so that the power of the detachable multimedia control apparatus 1 can be turned on by the power switch 3025.

After the power module is switched on by the power switch 3025, an LED light 3027 disposed on the top housing structure 30 is lit. If the power module is to be turned off, the power switch 3025 must be pressed and held for two seconds, and the LED light 3027 lights out after the power is off. The anti-theft switch 3023 allows the detachable multimedia control apparatus 1 to enter an anti-theft mode. When the anti-theft operation is to be activated, the anti-theft switch 3023 is pressed once in the power-on state, and then the following buttons are pressed sequentially: (1) the power switch 3025; (2) the central light brightness control button 3021; (3) the light flash control button 3019 (the sequence can be alternated or a same button can be pressed for three times). Subsequently, the anti-theft switch 3023 is pressed once more, and a long beeping sound (produced by an alarming horn, not shown) is provided, which indicates that all of the current operating states are put on-hold and the anti-theft state (the LED light 3027 flashes every 5 seconds) is activated. When the anti-theft state is to be deactivated, the anti-theft switch 3023 is pressed, and then the input codes for activation ((1) the power switch 3025; (2) the central light brightness control button 3021; (3) the light flash control button 3019, the sequence can be alternated or a same button can be pressed for three times) are entered. Next, the anti-theft switch 3023 is pressed one more time, so that the anti-theft state is deactivated when two beeping sounds are heard. At this time, the LED light 3027 remains lit and restores to the previous state of use. If an error occurs, three beeping sounds will be heard to signal errors. If error successively occurs for three times, an alarm of 15 seconds will be sounded (by an alarming horn, not shown). If a set password cannot be recalled, the anti-theft state has to be deactivated (two beeping sounds will be heard) by the safety switch module 207.

Besides, in an embodiment of the present invention, the detachable multimedia control apparatus 1 may further comprise a USB slot (not shown) and a memory card slot (not shown). The USB slot and the memory card slot may be disposed on the rear housing structure 20. In other embodiments, the USB slot and the memory card slot may be disposed on other housing structures, and the USB slot and the memory card slot are electrically connected to the processor (not shown). Furthermore, the USB slot and an USB device can be connected to each other, or the memory card slot and a memory card can be connected to each other, such that the detachable multimedia control apparatus 1 allows the speaker module to function as a MP3 music player device through the processing of the processor. Whereas, the forward/volume up button 3011 can control the detachable multimedia control apparatus 1 to play the next song/increase the volume (holding down to increase volume). The paly/pause button 3013 can control the detachable multimedia control apparatus 1 to play/pause the music. In addition, the backward/volume down button 3015 can control the detachable multimedia control apparatus 1 to play the previous song/decrease the volume (holding down to decrease volume). Furthermore, the USB slot and a charging device (such as a mobile power pack) are connected to each other such that the detachable multimedia control apparatus 1 is charged.

On the other hand, in another embodiment of the present invention, the detachable multimedia control apparatus 1 may further comprise an antenna (not shown). The antenna is electrically connected to the processor and may be disposed inside or outside of the detachable multimedia control apparatus 1. The speaker module receives an amplitude modulation (AM) or frequency modulation (FM) signal via the control of the antenna, the processor and the control module 301 such that the speaker module functions as a radio. When the speaker module functions as a radio, similarly, the forward/volume up button 3011 can control the detachable multimedia control apparatus 1 to go forward to the next radio station/increase the volume (holding down to increase volume). The paly/pause button 3013 can control the detachable multimedia control apparatus 1 to be mute or to search and store radio station channels (holding down for 2 seconds to perform searching and storing of radio stations channels). The backward/volume down button 3015 can control the detachable multimedia control apparatus 1 to go back to the previous radio station/decrease the volume (holding down to decrease volume). The MP3/radio switch button 3017 allows the detachable multimedia control apparatus 1 to be switched between a MP3 music player device and a radio.

In addition, in an embodiment of the present invention, the power switch 3025 may include signals in two colors, such as a blue signal and a red signal. The states of the blue signal stand for the followings: A. remains lit: representing the power is on; B. flashes every 5 second: representing an anti-theft mode; C. flashes: representing a pause; and, D. irregular: representing a search for FM radio stations. The states of the red signal stand for the followings: A. remains lit: representing a state on charging; and, B. flashes: representing the battery is low and charging is required.

Further, in an embodiment of the present invention, the top housing structure 30 of the detachable multimedia control apparatus 1 may further comprise a solar panel 303. The solar panel 303 is electrically connected to the processor and the power module, which are located inside the detachable multimedia control apparatus 1, to supply power to the power module. One must understand that, in another embodiment of the present invention, the control module 301 is integrated into a touch screen, and the solar panel 303 is adjusted to be hung externally to prevent the problem of insufficient disposing space.

Figure 6:
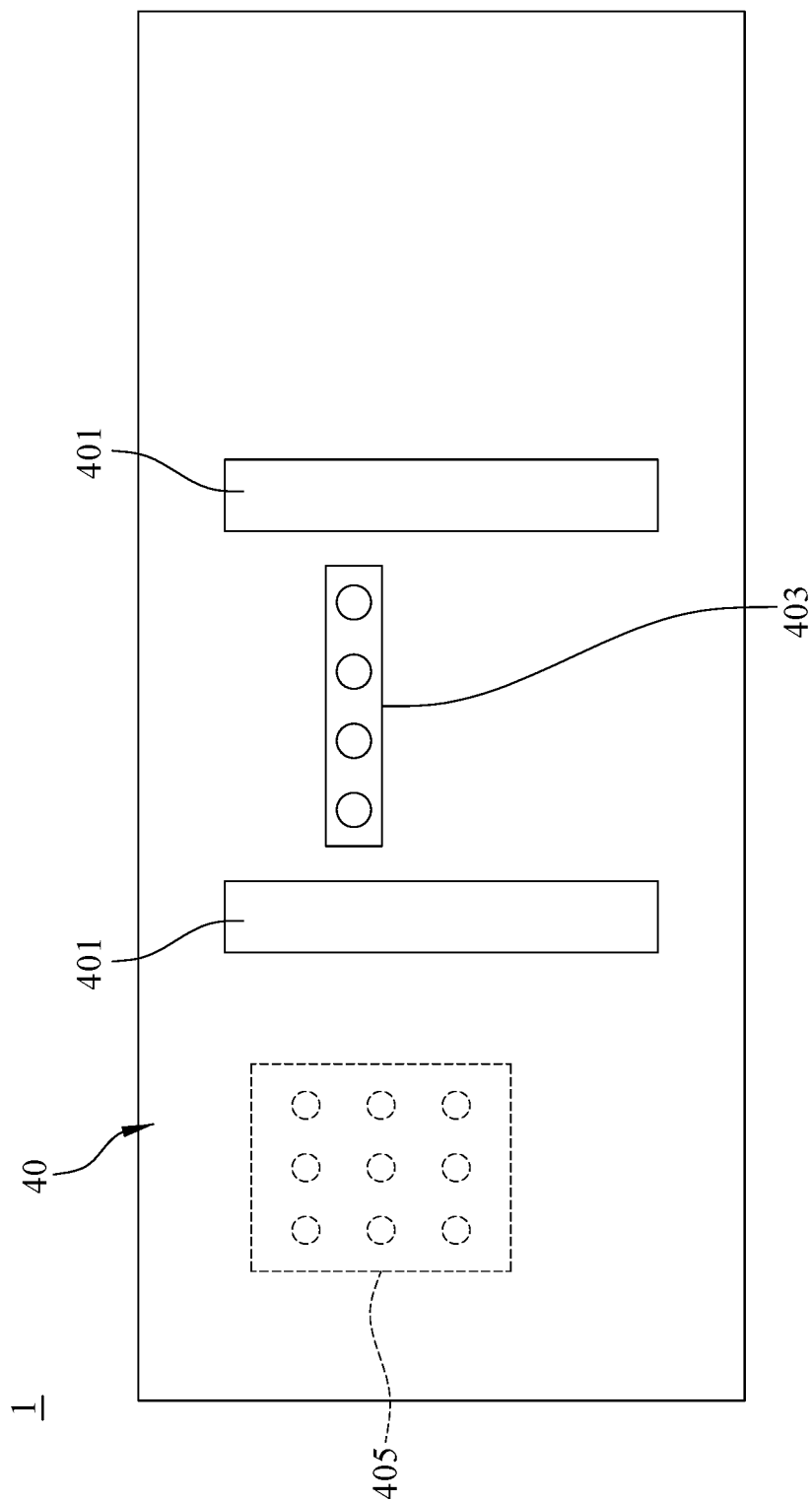
FIG. 6 is a schematic diagram of the bottom housing structure of the detachable multimedia control apparatus according to an embodiment of the present invention.

FIG. 6 is a schematic diagram illustrating the bottom housing structure of the detachable multimedia control apparatus according to an embodiment of the present invention. Referring to FIG. 6, the bottom housing structure 40 of an embodiment of the present invention is opposite to the top housing structure 30. The bottom housing structure 40 includes a first joining structure 401, an external control module 403 and an alarming horn 405. The first joining structure 401 may be a first slide groove structure. The first joining structure 401 allows the detachable multimedia control apparatus 1 to be connected to an external equipment (not shown), or, allows the detachable multimedia control apparatus 1 to be connected through an adaptor (not shown) before being connected to an external equipment, so that the detachable multimedia control apparatus 1 is configured to be detachable. The external module 403 is electrically connected to the processor, which is located inside the detachable multimedia control apparatus 1, such that the detachable multimedia control apparatus 1 can be electrically connected to another detachable multimedia control apparatus (not shown) through the external control module 403 in a wire or wireless manner. The alarming horn 405 allows the detachable multimedia control apparatus 1 in the anti-theft mode (as described above) to sound an alarm or other types of warning sounds. For example, when the left turn signal 101 and/or the right turn signal 103 flashes, the alarming horn 405 sounds an indicating sound at the same time.

Figure 7:
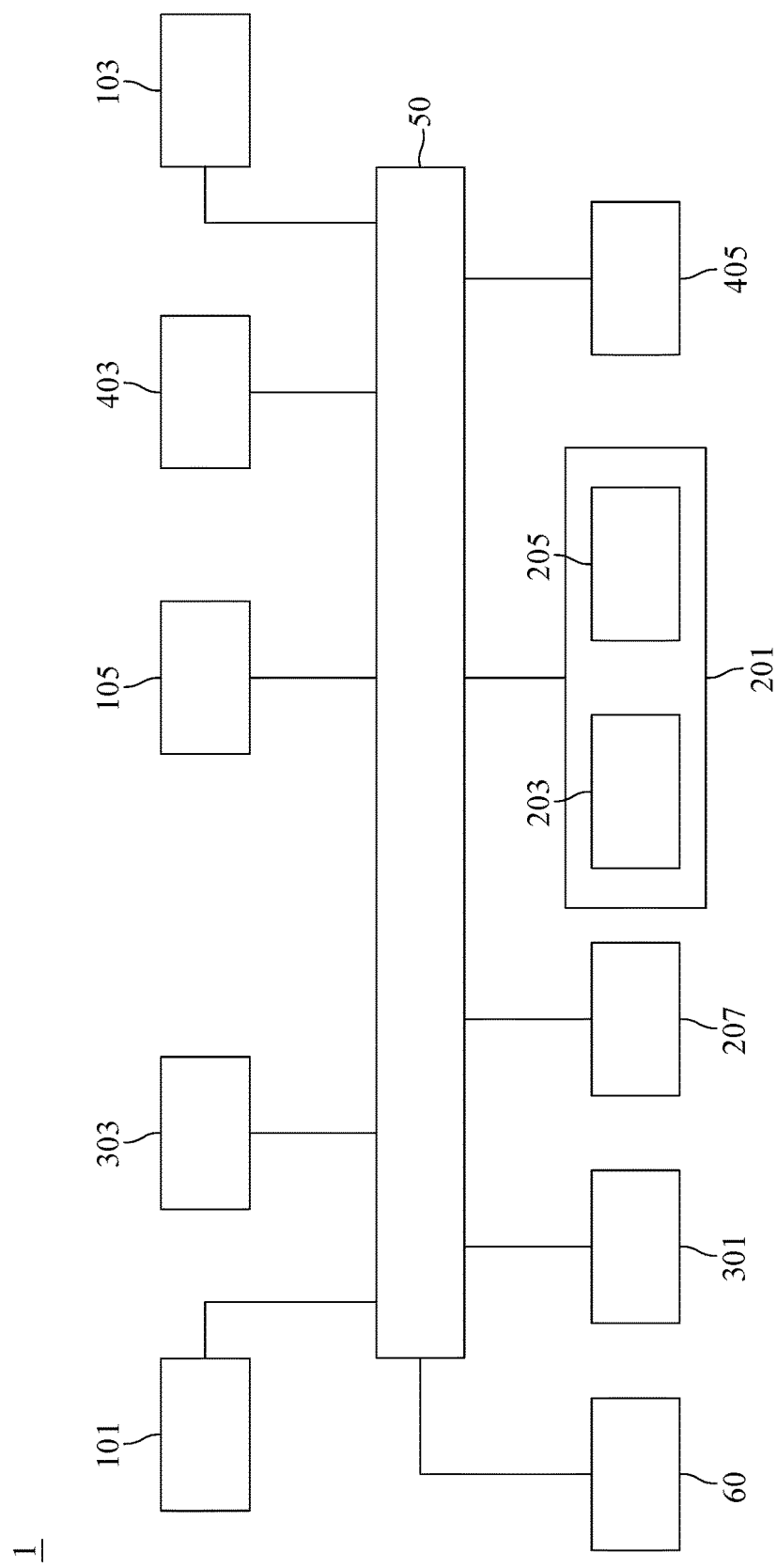
FIG. 7 is a block diagram illustrating the connection among the elements of the detachable multimedia control apparatus according to an embodiment of the present invention.

FIG. 7 is a block diagram illustrating the connection among the elements of the detachable multimedia control apparatus according to an embodiment of the present invention. Referring to FIG. 7, the detachable multimedia control apparatus 1 comprises a processor 50 and a power module 60. The processor 50 is disposed inside the detachable multimedia control apparatus 1, and is electrically connected to the left turn signal 101, the right turn signal 103, the central light 105, the speaker module 201 (including the left audio channel 203 and the right audio channel 205), the safety switch module 207, the control module 301, the solar panel 303, the external control module 403, the alarming horn 405 and the power module 60. The power module 60 is also disposed inside the detachable multimedia control apparatus 1, and is electrically connected to the left turn signal 101, the right turn signal 103, the central light 105, the speaker module 201 (including the left audio channel 203 and the right audio channel 205), the processor 50, the control module 301, the solar panel 303 and the alarming horn 405. The power module 60 is activated by the safety switch module 207 and the control module 301.

Figure 8:
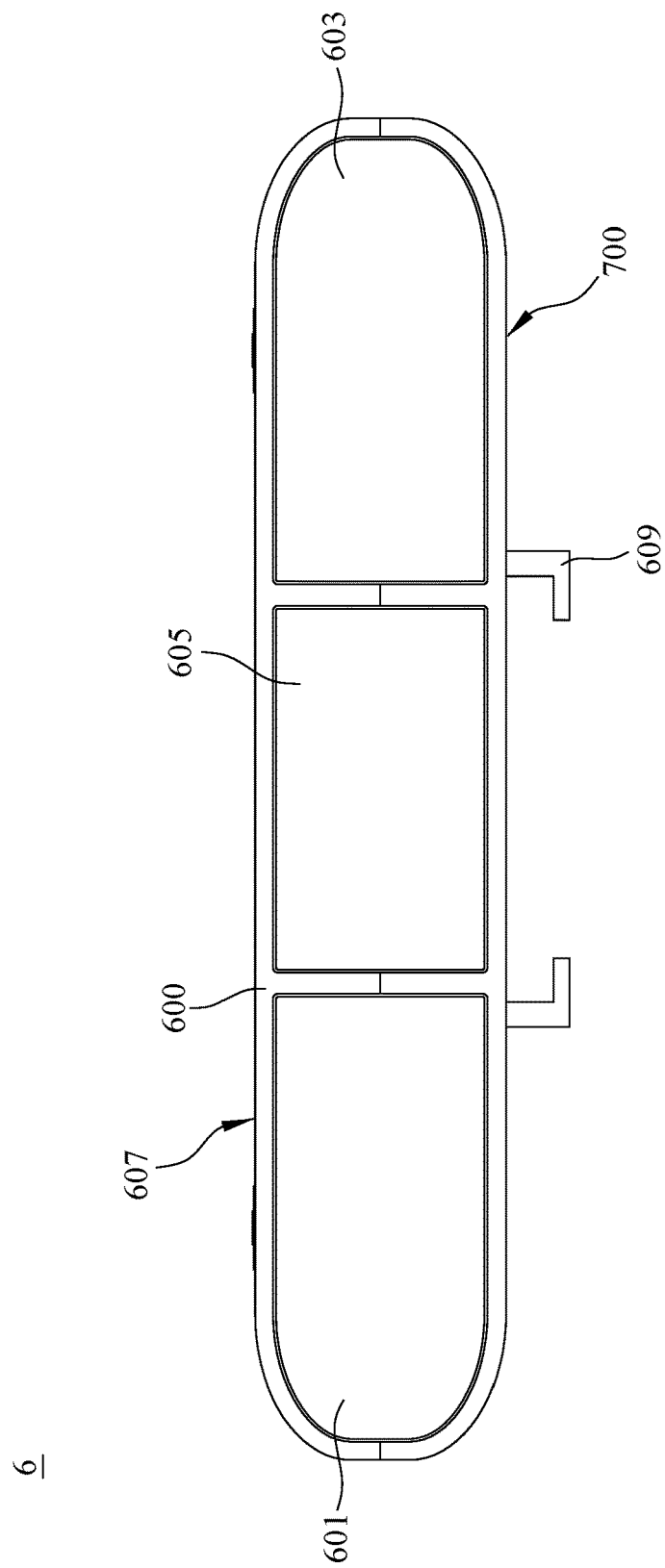
FIG. 8 is a front view of the rear type multimedia indication device according to an embodiment of the present invention.

FIG. 8 is a front view illustrating the front view structure of the rear type multimedia indication device according to an embodiment of the present invention. Referring to FIG. 8, in an embodiment of the present invention, the detachable multimedia control apparatus 1 further comprises a rear type multimedia indication device 6. The detachable multimedia control apparatus 1 may be electrically connected to the rear type multimedia indication device 6 by the external control module 403, and the two detachable multimedia control apparatus, which have been electrically connected, can function as a head warning light and a tail warning light of a bicycle respectively. In an embodiment of the present invention, the appearance and structure of the rear type multimedia indication device 6 may be the same as the detachable multimedia control apparatus 1, but its housing structures are in simplified forms. In other embodiments of the present invention, the appearance and structure of the rear type multimedia indication device 6 may be a single-sided circuit board composed of a plurality of LED lights. The housing structures of the rear type multimedia indication device 6 will be described hereafter. In FIG. 8, the rear type multimedia indication device 6 includes a simple front housing structure 600, a simple rear housing structure (not shown), a simple top housing structure 607 and a simple bottom housing structure 700. The simple front housing structure 600 includes a left turn warning signal 601, a right turn warning signal 603 and a central brake light 605. As shown from the simple front housing structure 600, the simple bottom housing structure 700 of the rear type multimedia indication device 6 has a second joining structure 609. The simple rear housing structure is opposite to the simple front housing structure 600, and the simple bottom housing structure 700 is opposite to the simple top housing structure 607. Similarly, in an embodiment of the present invention, the simple front housing structure 600 and the simple rear housing structure (not shown) are fixed to the simple top housing structure 607. After the fixation is completed, the simple bottom housing structure 700 is engaged with the simple front housing structure 600, the simple rear housing structure (not shown), and the simple top housing structure 607 to constitute the rear type multimedia indication device 6.

Figure 9:
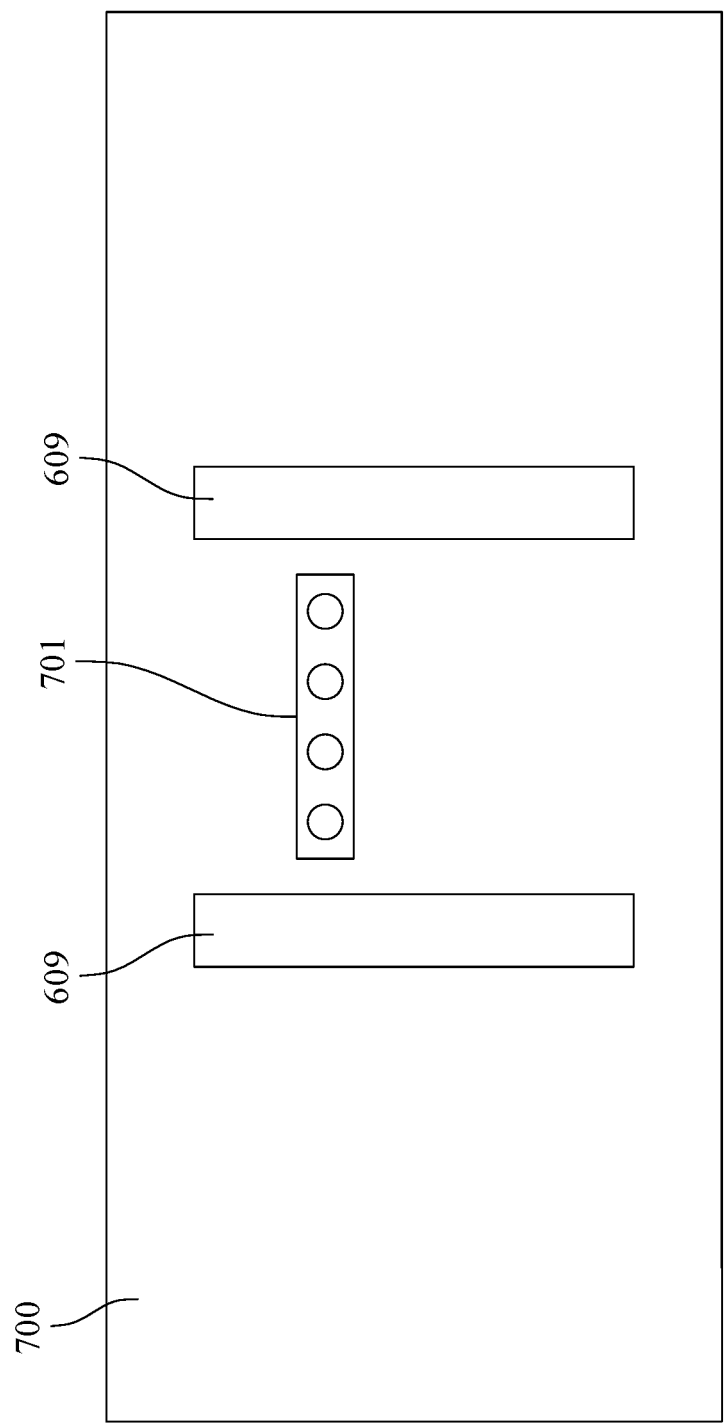
FIG. 9 is a rear view of the rear type multimedia indication device according to an embodiment of the present invention.

FIG. 9 is a rear view illustrating the rear view structure of the rear type multimedia indication device according to an embodiment of the present invention. Referring to FIG. 9, the simple bottom housing structure 700 is opposite to the simple top housing structure 607, and the simple bottom housing structure 700 includes a second joining structure 609 and a simple external control module 701. The second joining structure 609 may be a second slide groove structure. The second joining structure allows the rear type multimedia indication device 6 to be connected to an external equipment (not shown), or, allows the rear type multimedia indication device 6 to be connected through an adaptor (not shown) before being connected to an external equipment, so that the rear type multimedia indication device 6 is detachable. The simple external module 701 is electrically connected to a simple processor (not shown) which is located inside the rear type multimedia indication device 6. The simple external module 701 is also electrically connected to the external control module 403 of the detachable multimedia control apparatus 1 in a wire or wireless manner, so that the detachable multimedia control apparatus 1 can be electrically connected to the rear type multimedia indication device 6 through the external control module 403 and the simple external control module 701. Besides, in an embodiment of the present invention, the rear type multimedia indication device 6 of the detachable multimedia control apparatus 1 further includes a brake sensor (not shown). The rear type multimedia indication device 6 may be electrically connected to the brake sensor (not shown) disposed on a rim of a bicycle by the simple external control module 701. The brake sensor is electrically connected to the simple processor and the central brake light 605. In other words, when the brake sensor detects a brake of the bicycle, the central brake light 605 is lit. In addition, one must understand that, drawings of the simple rear housing structure and the simple top housing structure 607 are not shown because other than those structures shown in FIG. 8 and FIG. 9, the rear type multimedia indication device 6 has no other devices disposed on the other housing structures.

On the other hand, the rear type multimedia indication device 6 of the detachable multimedia control apparatus 1 may further include a USB slot (not shown), the USB slot may be disposed on the simple rear housing structure (not shown). In other embodiments, the USB slot may be disposed on other housing structures. The USB slot is electrically connected to the processor (not shown), and the USB slot and a charging device (such as a mobile power pack) may be connected to each other for charging the rear type multimedia indication device 6.

Figure 10:
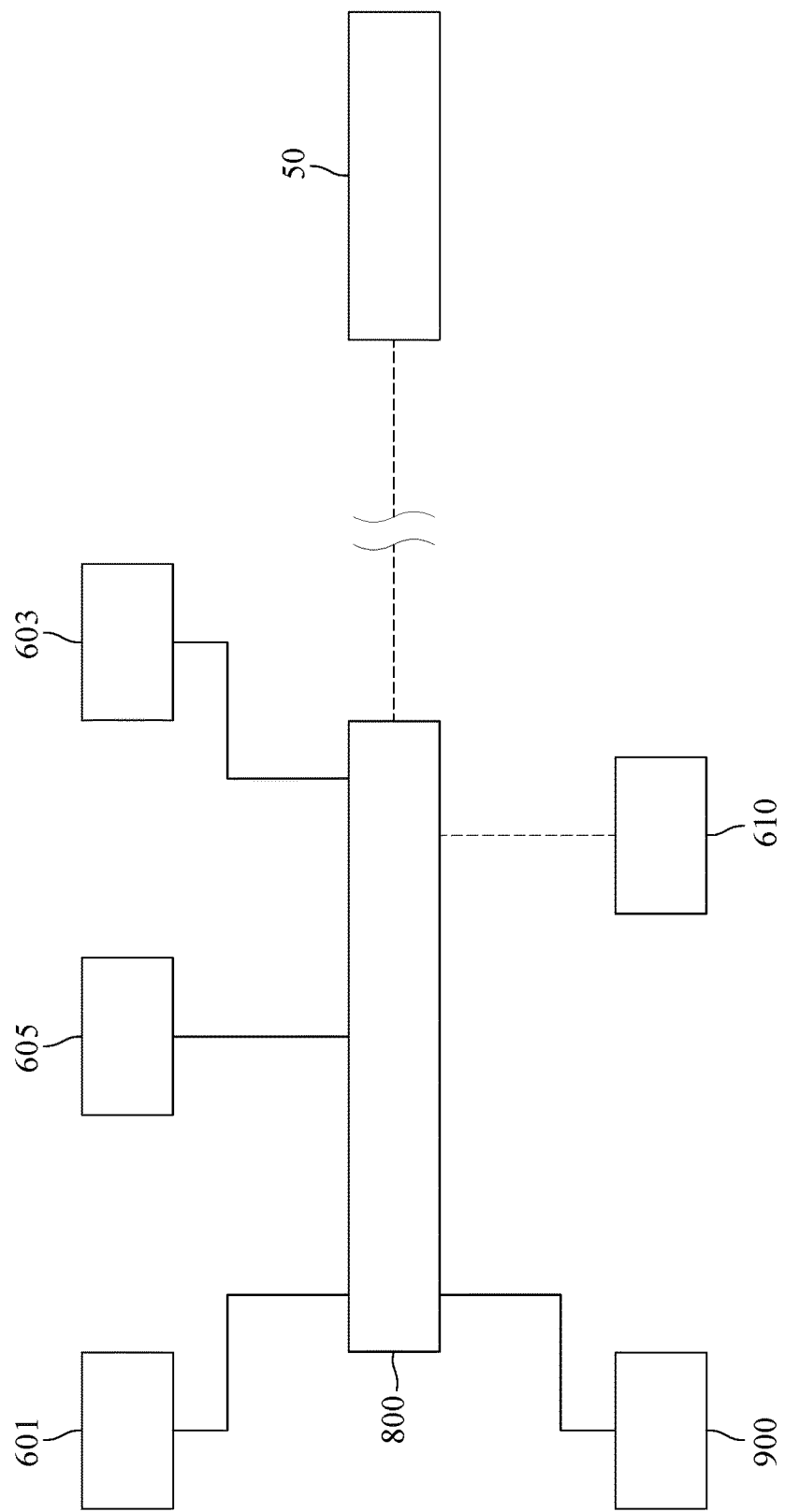
FIG. 10 is a block diagram illustrating the connection among the elements of the rear type multimedia indication device according to an embodiment of the present invention.

FIG. 10 is a block diagram illustrating the connection among the elements of the rear type multimedia indication device according to an embodiment of the present invention. Referring to FIG. 10, the rear type multimedia indication device 6 includes a simple processor 800 and a simple power module 900. The simple processor 800 is disposed inside the rear type multimedia indication device 6. The simple processor 800 is electrically connected to the left turn warning signal 601, the left turn warning signal 603, the central brake light 605 and the brake sensor 610. In addition, the simple processor 800 is electrically connected to the processor 50 of the detachable multimedia control apparatus 1 by the simple external control module 701. The simple power module 900 is also disposed inside the rear type multimedia indication device 6, and the simple power module 900 is electrically connected to the left turn warning signal 601, the right turn warning signal 603, the central brake light 605, the simple processor 800 and the brake sensor 610.

Figure 11:
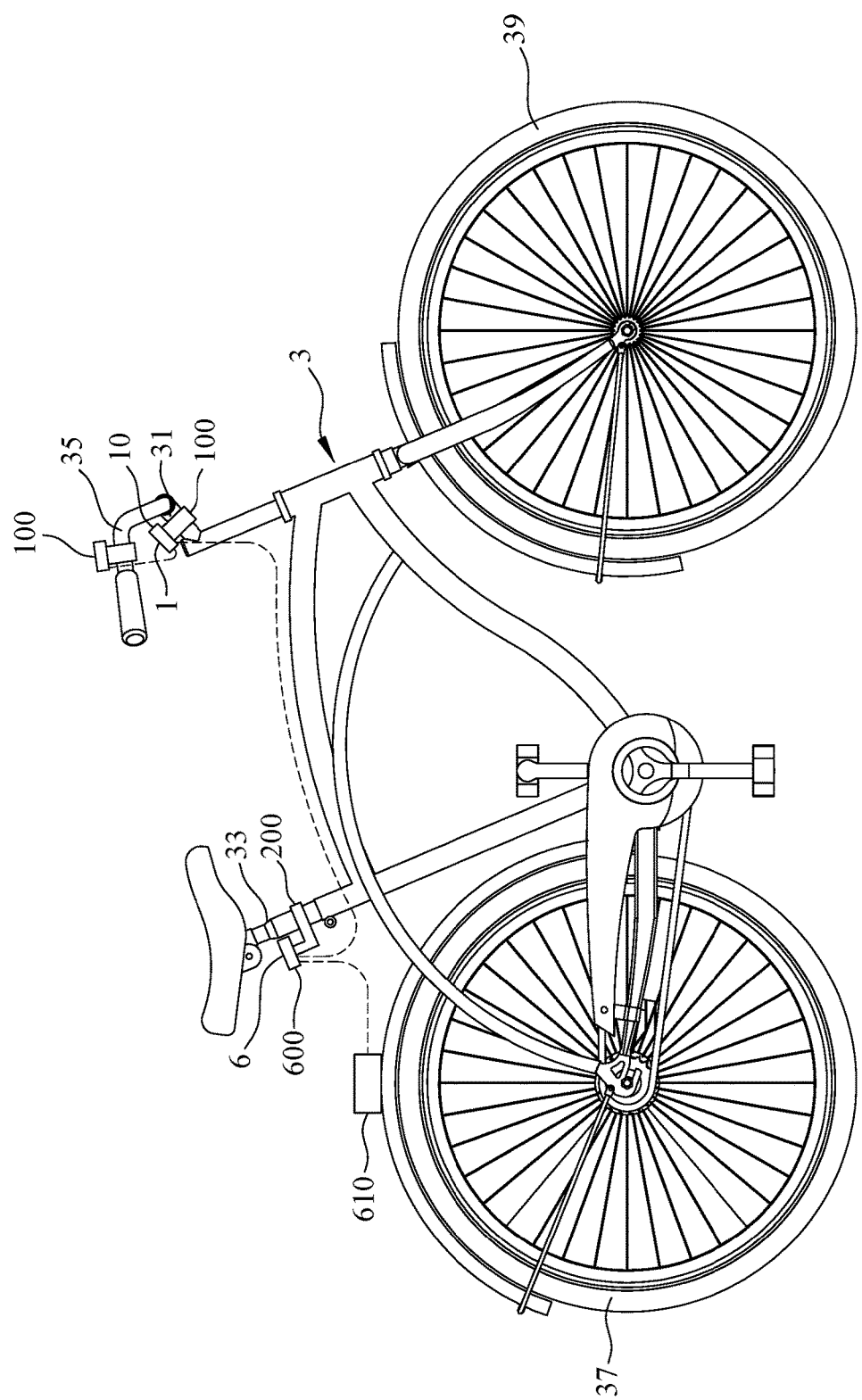
FIG. 11 is a schematic diagram of the implementation of an embodiment of the present invention.

FIG. 11 is a schematic diagram illustrating the implementation of an embodiment of the present invention. Referring to FIG. 11, in an embodiment of the present invention, the detachable multimedia control apparatus 1 may be installed onto a bicycle frame 31 of a bicycle 3 by an adaptor 100, and the rear type multimedia indication device 6 may be installed on a seatpost 33 of the bicycle 3 by an adaptor 200. After the detachable multimedia control apparatus 1 and the rear type multimedia indication device 6 are installed on the bicycle 3, the front housing structure 10 of the detachable multimedia control apparatus 1 faces the external of the head of the bicycle and the simple front housing structure 600 of the rear type multimedia indication device 6 faces the external of the tail of the bicycle. The detachable multimedia control apparatus 1 and the rear type multimedia indication device 6 are electrically connected (in a wire or wireless manner) with each other by the external control module 403 and the simple external control module 701 respectively. In addition, the brake sensor 610 is installed on a rear wheel rim 37, and the brake sensor 610 is electrically connected to the simple processor 800 and the central brake light 605 of the rear type multimedia indication device 6 by the simple external control module 701. In other words, when the brake sensor 610 detects a brake from the rear wheel of the bicycle 3, the central brake light 605 is lit. Similarly, the rear type multimedia indication device 6 may further include a second brake sensor (not shown). The second brake sensor (not shown) may be installed on the front wheel rim 39. The second brake sensor is electrically connected to the processor 50 of the detachable multimedia control apparatus 1 by the external control module 403, and then electrically connected to the simple processor 800 of the rear type multimedia indication device 6 by the processor 50, the external control module 403 and the simple external control module 701. In other words, when the second brake sensor detects a brake from the front wheel of the bicycle 3, the central brake light 605 is lit.

Figure 12:
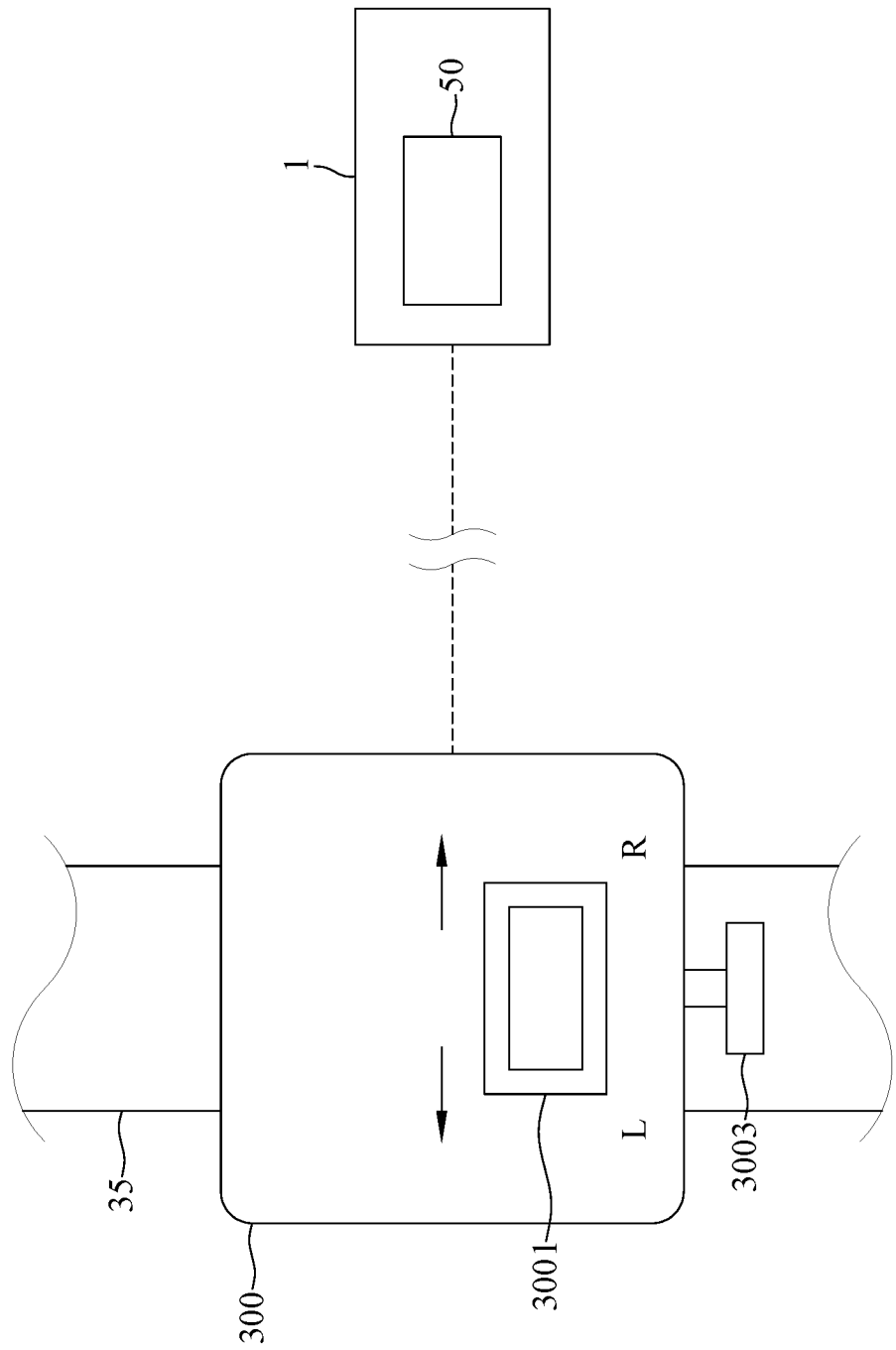
FIG. 12 is a schematic diagram of the turn signal controller according to an embodiment of the present invention.

FIG. 12 is a schematic diagram illustrating the turn signal controller according to an embodiment of the present invention. Referring to FIG. 11 and FIG. 12, in an embodiment of the present invention, the detachable multimedia control apparatus 1 may further comprise a turn signal controller 300. The detachable multimedia control apparatus 1 is electrically connected to the turn signal controller 300 by the processor 50. The turn signal controller 300 is disposed on a handlebar 35 of the bicycle 3. The left turn signal 101, the right turn signal 103, the left turn warning signal 601 and the right turn warning signal 603 are turned on by controlling a turn button 3001 on the turn signal controller 300. More specifically, when the user turns the turn button 3001 to the right (R), the right turn signal 103 of the detachable multimedia control apparatus 1 and the right turn warning signal 603 of the rear type multimedia indication device 6 is lit in a flashing manner. When the user turns the turn button 3001 to the left (L), the left turn signal 101 of the detachable multimedia control apparatus 1 and the left turn warning signal 601 of the rear type multimedia indication device 6 is lit in a flashing manner. At the same time, the left turn warning signal 601 and the right turn warning signal 603 flash, and the alarming horn 405 sounds a warning/indication sound to warn the vehicles and pedestrians coming from the front and back sides. In addition, the turn signal controller 300 includes a horn button 3003. When the user presses the horn button 3003, the alarming horn 405 of the detachable multimedia control apparatus 1 sounds to warn nearby vehicles and pedestrians. When the brake sensor 610 of the rear type multimedia indication device 6 detects a brake form the bicycle 3, the central light 605 of the rear type multimedia indication device 6 will be lit. On the other hand, the light flash control button 3019 within the control module 301 of the detachable multimedia control apparatus 1 can control the central brake light 605 of the rear type multimedia indication device 6 to flash. For example, the light flash control button 3019 is pressed once to flash the left turn warning signal 601 and the right turn warning signal 603. When the light flash control button 3019 is pressed one more time, the central brake light 605 displays the maximum brightness while the left turn warning signal 601 and the right turn warning signal 603 flash. When the light flash control button 3019 is pressed another time, the central brake light 605 is turned off but the left turn warning signal 601 and the right turn warning signal 603 keep flashing. When the light flash control button 3019 is pressed further one more time, all the signals are turned off. The above-mentioned cycle can be repeated to warn the vehicles coming from the back side. One must understand that, in an embodiment of the present invention, the left turn signal 101, the right turn signal 103, the left turn warning signal 601 and the right turn warning signal 603 are turned on by the turn signal controller 300. In another embodiment of the present invention, a tilt sensor (not shown) can be installed at the detachable multimedia control apparatus 1 and the rear type multimedia indication device 6 respectively. In such a way, the left turn signal 101, the right turn signal 103, the left turn warning signal 601 and the left turn warning signal 603 can be automatically lit by the tilt sensor when the bicycle 3 is tilted due to a left turn or right turn of the bicycle 3.

Figure 13A:
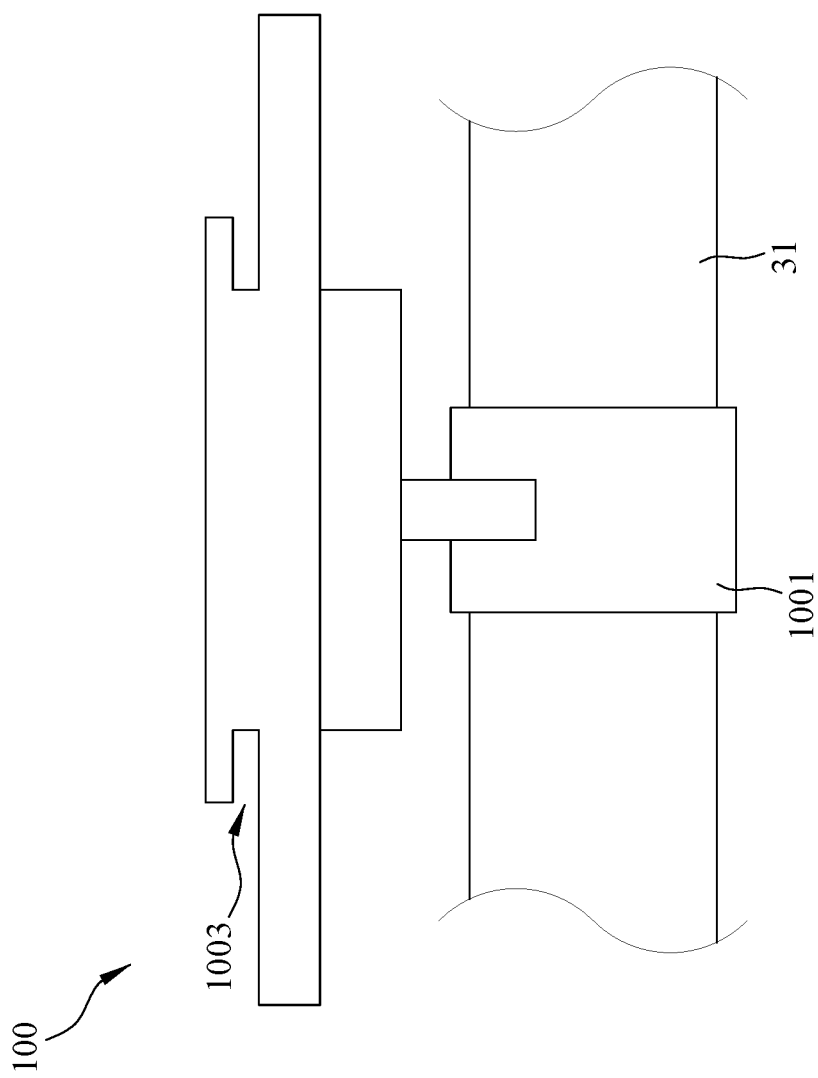
FIG. 13a is schematic diagram of the structure of an adaptor according to an embodiment of the present invention.

FIG. 13a is a schematic diagram illustrating the structure of an adaptor according to an embodiment of the present invention, and FIG. 13b is a schematic diagram illustrating the structure of another adaptor according to an embodiment of the present invention. Referring to FIG. 13a, in an embodiment of the present invention, the adaptor 100 includes a fixing structure 1001 and an adapting slide groove 1003. The fixing structure 1001 allows the adaptor 100 to be fixed on the bicycle frame 31. The adapting slide groove 1003 may be engaged with the first joining structure 401 of the bottom housing structure 40 of the detachable multimedia control apparatus 1, so that the detachable multimedia control apparatus 1 becomes detachable. Further referring to FIG. 13b. FIG. 13b is a side view, in an embodiment of the present invention, the adaptor 200 includes a fixing structure 2001 and an adapting slide groove 2003. The fixing structure 2001 allows the adaptor 200 to be fixed on the seatpost 33. The adapting slide groove 2003 may be engaged with the second joining structure 609 of the simple bottom housing structure 700 of the rear type multimedia indication device 6, so that the rear type multimedia indication device 6 becomes detachable. Several advantages are provided by the detachable multimedia control apparatus 1 and the detachable rear type multimedia indication device 6. For examples, the detachable multimedia control apparatus 1 can be removed to function independently as a MP3 music player or a radio when the bicycle 3 is not ridden or after the bicycle 3 has been ridden to the destination, or the detachable multimedia control apparatus 1 and/or the rear type multimedia indication device 6 can be installed to other equipment (such as a scooter or other transportations).

On the other hand, in another embodiment of the present invention, the detachable multimedia control apparatus 1 may further comprise a shelf (not shown) and a bluetooth device (not shown). The shelf is for placing a mobile device or a navigation device. The bluetooth device may be disposed inside the detachable multimedia control apparatus 1 and electrically connected to the processor 50 and the power module 60, so that wireless information transmission, such as music information, can be performed between a mobile device and the detachable multimedia control apparatus 1 by the bluetooth device. Furthermore, in an embodiment of the present invention, the detachable multimedia control apparatus 1 and the rear type multimedia indication device 6 are disposed on the bicycle 3 through the adaptor 100 and the adaptor 200. However, in other embodiments of the present invention, the detachable multimedia control apparatus 1 and the rear type multimedia indication device 6 may be directly disposed on the bicycle 3 through the first joining structure 401 and the second joining structure 609 respectively without the adaptor 100 and the adaptor 200.

According to the description above, the present invention provides a detachable multimedia control apparatus with entertainment and safety. The detachable multimedia control apparatus may be installed onto a bicycle or other transportations, so that the bicycle and other transportations are equipped with driving safety (including turn warning signals and brake lights). The detachable multimedia control apparatus can be removed to be independently used as a MP3 music player or a radio when the bicycle or transportations are not ridden, or the detachable multimedia control apparatus can be installed onto other devices.

The description above is provided only for explanting the preferable embodiments of the present invention, but not for limiting or restricting the present invention. Thus, any modifications or alternations to the present invention without departing from the spirit of the present invention are intended to be included within the protection scope of the present invention.

What is claimed is:

1. A detachable multimedia control apparatus, comprising:
    a front housing structure including a left turn signal, a right turn signal and a central light;
    a rear housing structure opposite to the front housing structure, wherein the rear housing structure includes a speaker module and a safety switch module;
    a top housing structure including a control module which controls the speaker module and the central light;
    a bottom housing structure opposite to the top housing structure, wherein the bottom housing structure includes a first joining structure;
    a processor disposed inside the movable multimedia control apparatus, wherein the processor is electrically connected to the left turn signal, the right turn signal, the central light, the speaker module, the safety switch signal and the control module; and
    a power module disposed inside the detachable multimedia control apparatus, wherein the power module is electrically connected to the left turn signal, the right turn signal, the central light, the speaker module and the processor, wherein the power module is configured to be unlocked by the safety switch module;
    wherein the front housing structure and the rear housing structure are fixed to the top housing structure, and the bottom housing structure is engaged with the front housing structure, the rear housing structure and the top housing structure; and
    wherein the control module includes a forward/volume up button, a play/pause button, a backward/volume down button, a MP3/radio switch button, a light flash control button, a central light brightness control button, an anti-theft switch and a power switch.

2. The detachable multimedia control apparatus according to claim 1, further comprising:
    a rear type multimedia indication device, wherein the processor of the detachable multimedia control apparatus is electrically connected to the rear type multimedia indication device by an external control module of the bottom housing structure, and the rear type multimedia indication device includes:
    a simple front housing structure including a left turn warning signal, a right turn warning signal and a central brake light;
    a simple rear housing structure opposite to the simple front housing structure;
    a simple top housing structure;
    a simple bottom housing structure opposite to the simple top housing structure, wherein the simple bottom housing structure includes a second joining structure;
    a simple processor disposed inside the rear type multimedia indication device and electrically connected to the processor, the left turn warning signal, the right turn warning signal, and the central brake light; and
    a simple power module disposed inside the rear type multimedia indication device and electrically connected to the left turn warning signal, the right turn warning signal, the central brake light, and the simple processor;
    wherein the simple processor is electrically connected to the processor by a simple external control module of the simple bottom housing structure; and
    wherein the simple front housing structure and the simple rear housing structure are fixed to the simple top housing structure, and the simple bottom housing structure is engaged with the simple front housing structure, the simple rear housing structure, and the simple top housing structure.

3. The detachable multimedia control apparatus according to claim 2, wherein the detachable multimedia control apparatus and the rear type multimedia indication device are joined to a bicycle by the first joining structure and the second joining structure respectively.

4. The detachable multimedia control apparatus according to claim 2, wherein the first joining structure is a first slide groove structure and the second joining structure is a second slide groove structure.

5. The detachable multimedia control apparatus according to claim 4, wherein the detachable multimedia control apparatus is joined to a bicycle by the first slide groove structure and a first adaptor, and the rear type multimedia indication device is joined to the bicycle by the second slide groove structure and a second adaptor.

6. The detachable multimedia control apparatus according to claim 3, wherein the detachable multimedia control apparatus further comprises a turn signal controller; the detachable multimedia control apparatus is further electrically connected to the turn signal controller by the processor; the turn signal controller is disposed on a handlebar of the bicycle; and the left turn signal, the right turn signal, the left turn warning signal and the right turn signal are switched on by the turn signal controller.

7. The detachable multimedia control apparatus according to claim 3, wherein the rear type multimedia indication device further comprises a brake sensor; the rear type multimedia indication device is electrically connected to the brake sensor by the simple processor and the simple external control module; and the brake sensor is disposed on a rear wheel rim of the bicycle.

8. The detachable multimedia control apparatus according to claim 7, wherein the rear type multimedia indication device further comprises a second brake sensor; the rear type multimedia indication device is further electrically connected to the second brake sensor by the simple processor, the simple external control module, the external control module, and the processor; and the second brake sensor is disposed on a front wheel rim of the bicycle.

9. The detachable multimedia control apparatus according to claim 1, wherein the speaker module includes a left audio channel and a right audio channel, the volume of the left audio channel and the right audio channel is configured to be controlled by the control module.

10. The detachable multimedia control apparatus according to claim 1, wherein the detachable multimedia control apparatus further comprises a first USB slot and a memory card slot, the first USB slot and the memory card slot are electrically connected to the processor.

11. The detachable multimedia control apparatus according to claim 2, wherein the rear type multimedia indication device further comprises a second USB slot which is electrically connected to the simple processor.

12. The detachable multimedia control apparatus according to claim 10, wherein the first USB slot and a charging device are connected to each other such that the detachable multimedia control apparatus is charged.

13. The detachable multimedia control apparatus according to claim 11, wherein the second USB slot and a charging device are connected to each other such that the rear type multimedia indication device is charged.

14. The detachable multimedia control apparatus according to claim 10, wherein the first USB slot and an USB device are connected to each other, or the memory card slot and a memory card are connected to each other, such that the speaker module of the detachable multimedia control apparatus functions as a MP3 music player device.

15. The detachable multimedia control apparatus according to claim 1, wherein the detachable multimedia control apparatus further comprises an antenna, the antenna is electrically connected to the processor, and the speaker module receives an amplitude modulation or frequency modulation signal via the antenna, the processor and the control module such that the speaker module functions as a radio.

16. The detachable multimedia control apparatus according to claim 1, wherein the detachable multimedia control apparatus further comprises a shelf for placing a mobile device or a navigation device.

17. The detachable multimedia control apparatus according to claim 1, wherein the bottom housing structure further comprises an alarming horn for sounding an alarm.

18. A detachable multimedia control apparatus, comprising:
  a front housing structure including a left turn signal, a right turn signal and a central light;
  a rear housing structure opposite to the front housing structure, wherein the rear housing structure includes a speaker module and a safety switch module;
  a top housing structure including a control module which controls the speaker module and the central light;
  a bottom housing structure opposite to the top housing structure, wherein the bottom housing structure includes a first joining structure;
  a processor disposed inside the movable multimedia control apparatus, wherein the processor is electrically connected to the left turn signal, the right turn signal, the central light, the speaker module, the safety switch signal and the control module; and
  a power module disposed inside the detachable multimedia control apparatus, wherein the power module is electrically connected to the left turn signal, the right turn signal, the central light, the speaker module and the processor, wherein the power module is configured to be unlocked by the safety switch module;
  wherein the front housing structure and the rear housing structure are fixed to the top housing structure, and the bottom housing structure is engaged with the front housing structure, the rear housing structure and the top housing structure; and
  wherein the top housing structure further comprises a solar panel which is electrically connected to the power module.

19. A detachable multimedia control apparatus, comprising:
  a front housing structure including a left turn signal, a right turn signal and a central light;
  a rear housing structure opposite to the front housing structure, wherein the rear housing structure includes a speaker module and a safety switch module;
  a top housing structure including a control module which controls the speaker module and the central light;
  a bottom housing structure opposite to the top housing structure, wherein the bottom housing structure includes a first joining structure;
  a processor disposed inside the movable multimedia control apparatus, wherein the processor is electrically connected to the left turn signal, the right turn signal, the central light, the speaker module, the safety switch signal and the control module; and
  a power module disposed inside the detachable multimedia control apparatus, wherein the power module is electrically connected to the left turn signal, the right turn signal, the central light, the speaker module and the processor, wherein the power module is configured to be unlocked by the safety switch module;
  wherein the front housing structure and the rear housing structure are fixed to the top housing structure, and the bottom housing structure is engaged with the front housing structure, the rear housing structure and the top housing structure; and
  wherein the safety switch module is a lock structure.

* * * * *